Figure 1:
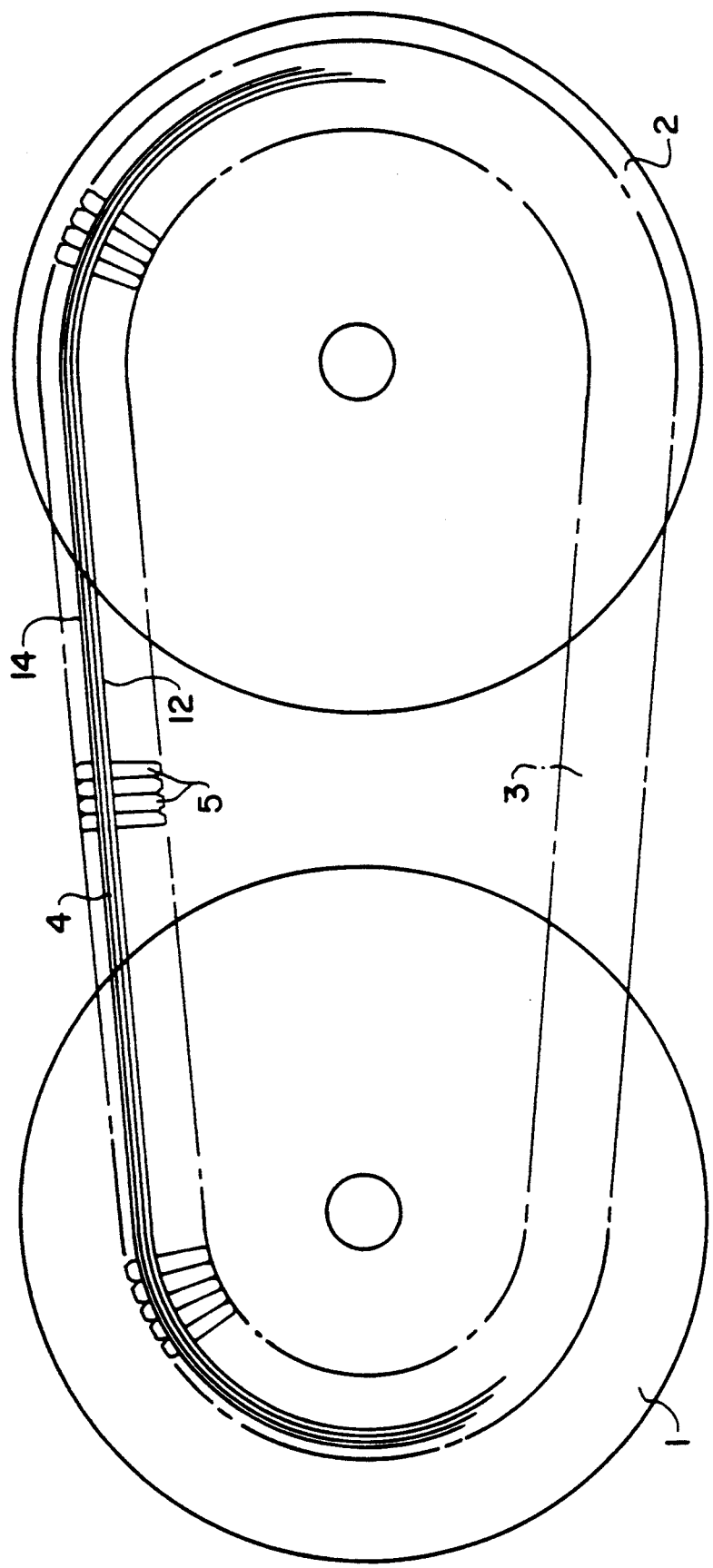

United States Patent [19]

Van der Zande

[11] Patent Number: 5,180,345

[45] Date of Patent: * Jan. 19, 1993

[54] DRIVING BELT PROVIDED WITH TRANSVERSE ELEMENTS AND TRANSVERSE ELEMENTS FOR SUCH DRIVING BELT

[75] Inventor: Cornelis P. Van der Zande, Heeze, Netherlands

[73] Assignee: Van Doorne's Transmissie, B.V., Tilburg, Netherlands

[*] Notice: The portion of the term of this patent subsequent to Dec. 19, 2003 has been disclaimed.

[21] Appl. No.: 550,203

[22] Filed: Nov. 9, 1983

[30] Foreign Application Priority Data

Nov. 12, 1982 [NL] Netherlands ............ 8204379

[51] Int. Cl.⁵ ............................................. F16G 5/00
[52] U.S. Cl. ..................................... 474/201; 474/242
[58] Field of Search ................. 474/201, 242, 244, 245

[56] References Cited

U.S. PATENT DOCUMENTS 4,386,921 6/1983 Roberts ............................ 474/201

FOREIGN PATENT DOCUMENTS 57-22441 2/1982 Japan .................................. 474/201

Primary Examiner—Thuy M. Bui
Attorney, Agent, or Firm—Cushman, Darby & Cushman

[57] ABSTRACT

The invention relates to a driving belt of substantially trapezoidal cross section for application on V-shaped pulleys, comprising an endless carrier with at least one endless strip-like band and a plurality of transverse elements slidably arranged on said carrier having slots for receiving the carrier.

Each slot is bordered by a contact surface for contacting the inner side of the carrier and a contact surface for contacting the outer side of the carrier. The contact surface contacting the outer side of the carrier has been curved convexly in the transverse direction in respect of the carrier in order to achieve an optimum contacting between transverse element and carrier, thus decreasing wear and improving life.

1 Claim, 2 Drawing Sheets

DRIVING BELT PROVIDED WITH TRANSVERSE ELEMENTS AND TRANSVERSE ELEMENTS FOR SUCH DRIVING BELT

The invention relates to a driving belt of substantially trapezoidal cross section for application on V-shaped pulleys, comprising an endless carrier with at least one endless strip-like band and comprising a plurality of transverse elements slidably arranged on said carrier having slots for receiving the carrier, each slot bordered by a contact surface for contacting the inner side of the carrier and a contact surface for contacting the outer side of the carrier. Such a driving belt is known from European patent application, publication number 0014013.

Practice has shown that the carrier is not only submitted to a high bending fatigue load during operation of the driving belt but also the guiding of the transverse elements in the correct path creates a considerable load, whereby it is very essential that the contact between transverse element and carrier is as much as optimum. In consequence wear can be reduced and life can be improved.

It is the object of the invention to provide a driving belt of the present kind, whereby the contact between carrier and transverse element is improved.

To this effect, according to the invention, the contact surface contacting the outer side of the carrier, transversely with respect to the carrier, has been curved. As a result this shape guarantees a contact surface as large as possible between the carrier and the transverse elements, because, as will be elucidated further, the outer side of the carrier running through the pulleys assumes transversely a concave curvature.

According to a further feature of the invention, preferably the curvature of the contact surface for contacting the outer side of the carrier having a radius of curvature between 50 and 1000 mm. So in particular between 100 and 300 mm.

Moreover the invention relates to a transverse element for application in a driving belt as described before.

The invention will now be elucidated with reference to the drawing.

Figure 2:
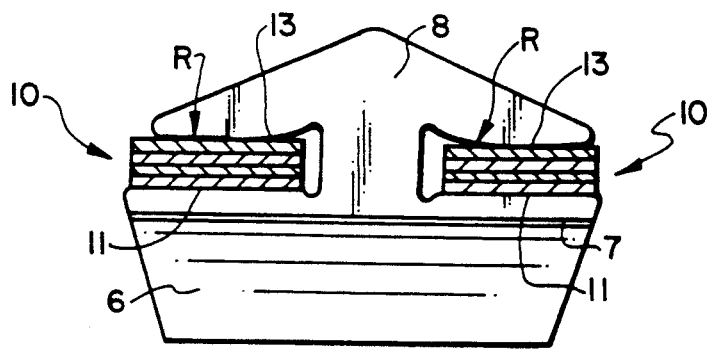
Figure 3:
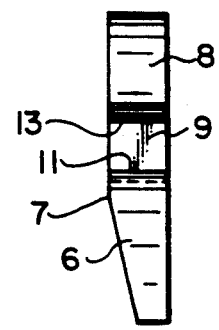
Figure 4:
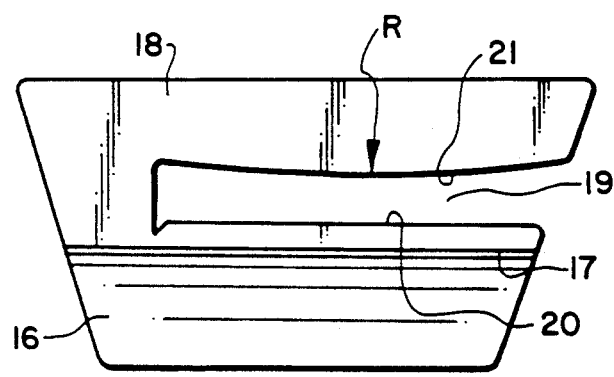
Figure 5:
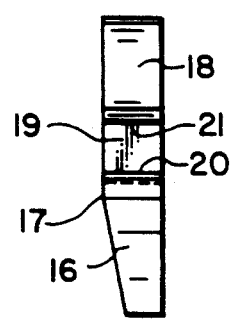
Figure 6:
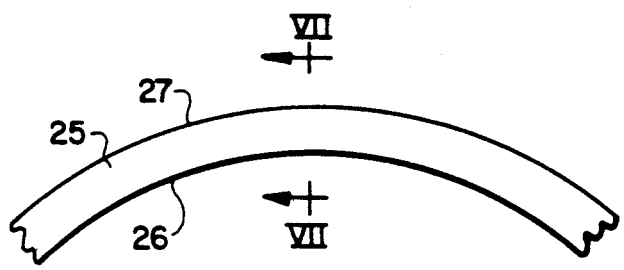
Figure 7:
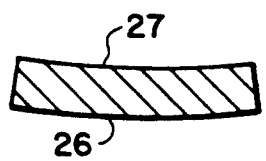

FIG. 1 schematically showing a driving belt passing over two pulleys;

FIG. 2 showing a front view of a first embodiment of a transverse element;

FIG. 3 showing a side view of the transverse element according to FIG. 2;

FIG. 4 showing a front view of a second embodiment of a transverse element;

FIG. 5 showing a side view of the transverse element according to FIG. 4;

FIG. 6 schematically showing a side view of a piece of the bent strip-like band and FIG. 7 showing a cross section on the line VII—VII of FIG. 6.

FIG. 1 showing two pulleys 1, 2 and the connecting driving belt 3 represented by a dot and dash line. This driving belt includes a carrier 4 comprising a number of endless strip-like bands, e.g. made of metal. The carrier 4 has been provided with a plurality of transverse elements 5, which may contact the pulleys. The transverse element according to the embodiment shown in FIG. 2, represented by a side view in FIG. 3, has been fitted with a bevel 6, which at the tilting line or roll-off zone 7 passes into part 8 having parallel head sides. The transverse element has been provided with two slots 9, wherein according to FIG. 2 two carriers 10 are shown, each comprising four strip-like endless bands. The slots 9 are bordered by a contact surface 11 for contacting the inner side (indicated with reference numeral 12 in FIG. 1) of the carrier and a contact surface 13 contacting the outer side of the carrier (indicated with reference numeral 14 in FIG. 1).

The transverse element according to the embodiment of FIG. 4, represented by a side view in FIG. 5, has been provided with a bevel 16, which at the tilting line or roll-off zone 17 passes into part 18 having parallel head sides. The transverse element has been provided with one slot 19, bordered by a contact surface 20 for contacting the inner side 12 of the carrier and a contact surface 21 for contacting the outer side 14 of the carrier.

According to FIG. 2 and FIG. 4, represented by letter R, the contact surfaces 13 and 21, transversely with respect to the carrier, 4, 10 have been curved. This curvature R improves the contacting of the contact surfaces 13 and 21 to the carrier, because pratice has shown that a carrier shaped as a strip-like band, which has been beat, at the same time assumes a curvature transversely to the direction of bending. This has been represented in the FIG. 6 and 7.

FIG. 6 schematically shows in a side view a piece of a bent strip-like band 25, while FIG. 7 shows a cross section on the line VII—VII. From FIG. 7 it may be obvious this cross section has been curved slightly. This curvature proceeds from the bending of the band 25 causing compression stresses at the inner side 26 and tensile stresses at the outer side 27 of the material. These compression—and tensile stresses—produce the curvature of the strip-like band as indicated in FIG. 7.

The indicated curvature of the strip-like band as shown in FIG. 7 does exist when the band in the pulleys 1, 2 has been bent and so it appears to be existing slightly at the moment the band (the carrier 4) leaves the pulley and accordingly pulls out the transverse element 5 from the pulley in order to guide said transverse element to the other pulley. In particular during this pull out action a good cooperation between the contact surface 13 and 21 resp. and the outside of the carrier has to be established, wherefor the proposed curvature R of the contact surface 3 and 21 respectively contributes clearly.

The indicated carrier shown in FIG. 2 consisting of two sets of bands each having four bands. This merely serving as an example, in case of metallic strip-like bands, e.g. sets of bands may be applied comprising ten bands each having a thickness of approximately 0.2 mm.

It is not even required that the set of bands 10 (FIG. 2) takes up the entire space 9. In particular there may be a certain clearance between the contact surface 13 and the outer side of the carrier.

I claim:

1. Driving belt of substantially trapezoidal cross section for application on V-shaped pulleys comprising an endless carrier having an inner side and an outer side and including at least one endless strip-like band and a plurality of transverse elements slidably arranged on said carrier, each transverse element having at least one slot for receiving the carrier, said slot bordered by a contact surface for contacting the inner side of the carrier and a contact surface for contacting the outer side of the carrier, characterized in that the contact surface for contacting the outer side of the carrier is convexly curved in the transverse direction in respect of the carrier 2. Driving belt according to claim 1, characterized in that the radius of curvature of the contact surface for contacting the outer side of the carrier ranges between 50 and 1000 mm.

3. Driving belt according to claim 2, characterized in that the radius of curvature ranges between 100 and 300 mm.

4. Transverse element for application on a driving belt according to claim 1, provided with a contact surface for contacting the outer side of the carrier, characterized in that the contact surface is convexly curved in the plane of the transverse element.

5. Transverse element according to claim 4, characterized in that the contact surface is convexly curved having radius of curvature ranging between 50 and 1000 mm.

6. Transverse element according to claim 5, characterized in that the radius of curvature ranges between 100 and 300 mm.

* * * * *